Jan. 6, 1925.
E. G. BRUEGGEMAN
1,522,101
PLUGGING BOX
Filed Nov. 29, 1920   2 Sheets-Sheet 1
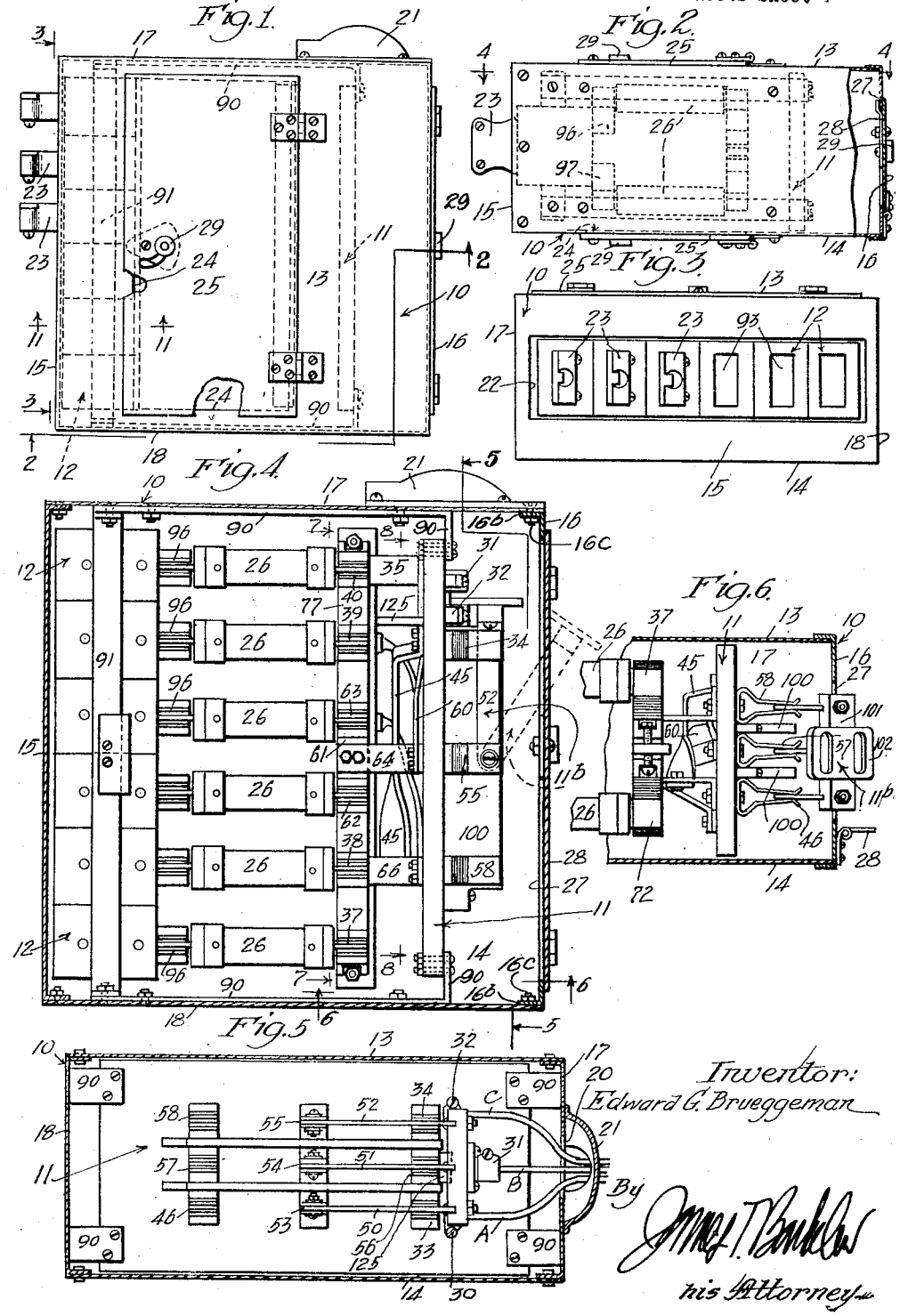
Inventor:
Edward G. Brueggeman
By
his Attorney Jan. 6, 1925.  1,522,101
E. G. BRUEGGEMAN
PLUGGING BOX
Filed Nov. 29, 1920  2 Sheets-Sheet 2
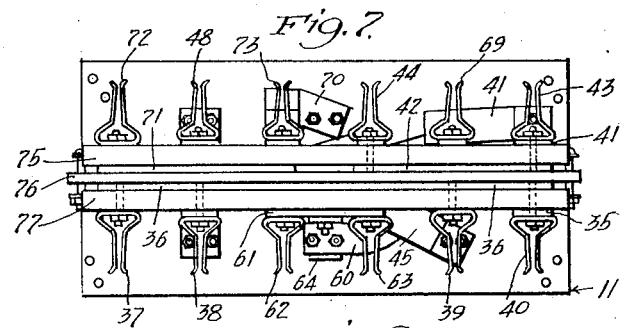
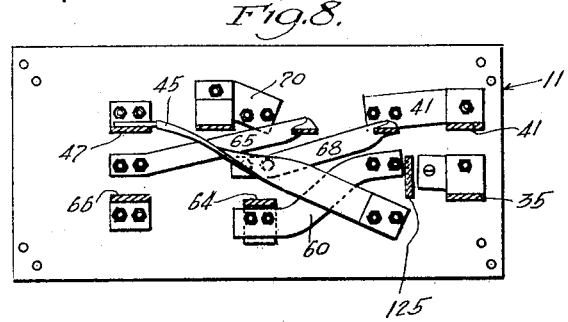
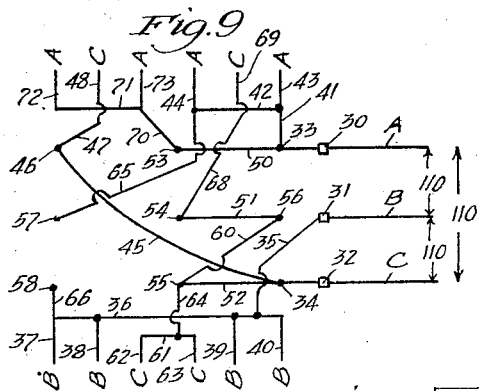
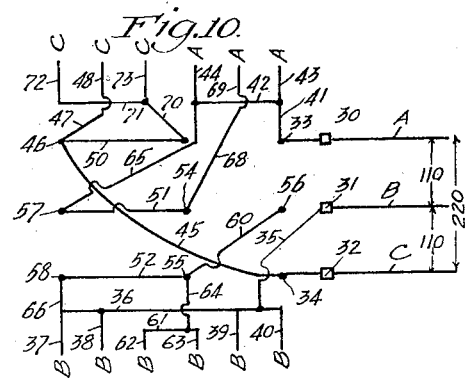
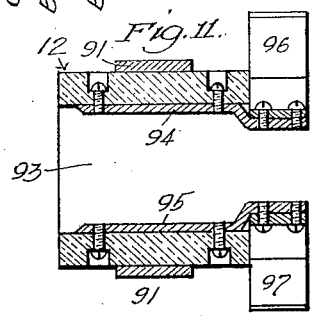
Inventor:
Edward G. Brueggeman.
By
his Attorneys Patented Jan. 6, 1925.

1,522,101

UNITED STATES PATENT OFFICE.

EDWARD GEORGE BRUEGGEMAN, OF LOS ANGELES, CALIFORNIA, ASSIGNOR OF ONE-HALF TO G. A. VEDDER, OF LOS ANGELES, CALIFORNIA.

PLUGGING BOX.

Application filed November 29, 1920. Serial No. 427,160.

*To all whom it may concern:*

Be it known that I, EDWARD G. BRUEGGE-MAN, a citizen of the United States, residing in Los Angeles, county of Los Angeles, State of California, have invented new and useful Improvements in Plugging Boxes, of which the following is a specification.

This invention has to do with a plugging box and it has for an object the provision of a device of this character which is simple and compact and which can be effectively used to carry and distribute various electric circuits.

Although this invention is not limited to embodiment in any specific form or type or device, it is particularly well adapted for use in portable plugging boxes such are used in connection with portable electrical machinery and apparatus, such, for instance, as is used on theatrical stages, in studios, etc. I am herein setting forth my invention in connection with a portable plugging box of the general character just referred to because of its particular applicability to such a device, it being understood, however, that such disclosure is to not act as a limitation of the scope of the invention.

Electrical apparatus, which is adapted to be transported from place to place and to be used in various localities, is usually equipped with what is known as a plugging box. This plugging box is adapted to be connected to the main power line and the various apparatus are connected to the plugging box through plugs removably arranged in the sockets of the plugging box. Such plugging boxes are ordinarily made to be connected in some one particular circuit, say for instance, in a three wire circuit wherein there is the same voltage across any two of the wires, or in a three wire circuit wherein there are different voltages between different sets of wires. The practical difficulty experienced in the use of these devices is that they must be used only in the circuit for which they are intended in order to maintain balance in the circuit and to obtain the proper voltage at the plugging sockets.

An object of the present invention is to provide a plugging box which can be used in connection with various circuits to obtain the proper voltage at all of the plugging sockets, and at the same time to maintain balance in the feed circuits. This eliminates the necessity of having a special plugging box for each particular circuit, enables proper balance of the circuit and proper voltage to be obtained under any usual working conditions, and effects a substantial saving in time and labor. A plugging box made in accordance with the present invention can be very easily and quickly set to handle the particular circuit in which it is connected and requires no special skill or care for its proper operation.

A noteworthy feature of the invention is the construction and arrangement which it provides. A plugging box constructed in accordance with the present invention is simple and compact, is safe and durable, is sightly in appearance, is easily operated and handled. These and other similar points make the device particularly practical and desirable for use and make it of great commercial value.

The various objects and features of the invention will be best and more fully understood from the following detailed description of a typical embodiment of the invention throughout which reference is had to the accompanying drawings in which—

Fig. 1 is a side elevation of a portable plugging box embodying the present invention; Fig. 2 is a bottom view of the same with parts in section, the view being taken as indicated by line 2—2 on Fig. 1; Fig. 3 is an end view of the same taken as indicated by line 3—3 on Fig. 1 showing the socket end of the box; Fig. 4 is an enlarged sectional view taken as indicated by line 4—4 on Fig. 2, showing the general arrangement of the interior of the box; Fig. 5 is a sectional view taken as indicated by line 5—5 on Fig. 4; Fig. 6 is a sectional view taken as indicated by line 6—6 on Fig. 4; Fig. 7 is a sectional view taken as indicated by line 7—7 on Fig. 4 being a view showing the device with the fuses removed; Fig. 8 is a sectional view taken as indicated by line 8—8 on Fig. 4; Figs. 9 and 10 are wiring diagrams showing the electrical connections of the device in two different positions and Fig. 11 is an enlarged sectional view taken as indicated by line 11—11 on Fig. 1.

The particular device that I am setting forth to illustrate my invention is adapted to handle either one of two typical electrical circuits to maintain balance in that circuit and to make the same voltage available at all of the plugs. The two circuits which the device will handle are circuits which are commonly used in practice and are typical of two different circuits which it is very often necessary to handle. One of these circuits is a three wire 110—220 volt D. C. circuit or a 110—220 A. C. circuit. In such a circuit 110 volts is available across the first and second wires, 110 volts is available across the second and third wires, and 220 volts is available across the first and third wires. The other circuit is a three wire A. C. circuit, say for instance a three wire 110 volts three phase A. C. circuit in which 110 volts is available between each pair of wires. When I refer to different electric circuits I mean electric circuits which vary or are different in the respects or characteristics above set forth and I do not necessarily mean circuits which vary or are different merely in voltage or frequency.

Throughout the drawings numeral 10 designates the frame or box in which is supported a switch plate 11 and a plurality of plug receptacles 12. Although the box 10 can be arranged or positioned in any desired manner I will describe it as normally positioned in the manner shown in Fig. 1 of the drawings. When in this position the box may be said to comprise, generally two opposite sides 13 and 14, two opposite ends 15 and 16, a top 17 and bottom 18. The box 10 is preferably formed of sheet metal and is constructed so that the end 16 is completely removable from the other parts. For instance, it may be formed with inwardly extending flanges 16ᵇ which fit within the sides 13 and 14, the top 17, and the bottom 18 and are detachably connected to said parts by bolts 16ᶜ. This construction facilitates placement of the switch plate, plug receptacles, etc., in the casing, as will be understood from the description which follows:

The switch plate 11 and the plug receptacle 12 are carried by brackets 90 removably mounted in the box 20. The switch plate 11 is a plate of insulating material and is carried by the brackets 90 so as to be parallel to and spaced inwardly from the end 16 of the box 10. A double throw knife switch 11ᵇ is mounted on the outer face of the switch plate 11 to be between the switch plate and the end 16. The switch comprises three blades 50, 51 and 52, supported at the middle portion of the plate 11 by pivotal mountings 53, 54 and 55, respectively. At the upper end of the plate 11 there are three switch jaws 33, 56, and 34 adapted to receive and cooperate with the switch blades 50, 51 and 52 respectively as shown in Figs. 4 and 5 of the drawings. At the lower end of the plate 11 there are switch jaws 46, 57 and 58 adapted to receive and cooperate with the blades 50, 51 and 52 respectively in the same manner as the jaws 33, 56, and 34. In the preferred form of construction there are partitions 100 between the switch blades and switch jaws as shown in the drawings. The outer ends of the blades 50, 51 and 52 may connect to a block 101 of insulating material to which there is connected a handle 102. With this construction the blade can be conveniently and simultaneously operated.

At the inner face of the switch plate 11 there is a plurality of bus-bars certain of which support a frame formed of strips 75, 76 and 77 of insulating material. On one side of this frame and facing the side 14 of the box 10 is a plurality of fuse sockets or clips 72, 48, 73, 44, 69 and 43, while on the other side of the frame and facing the side 13 of the box 10 are corresponding fuse clips 37, 38, 62, 63, 39 and 40. The fuse clips have connection with the various parts of the switch 11ᵇ through the various bus-bars as will be hereinafter described.

The plug receptacles 12 are independent porcelain members held together by frame members 91 which are carried by the brackets 90. Each receptacle is formed with an opening 93 to receive a plug 23. At opposite walls of the openings 93 are contacts 94, and 95 adapted to engage and cooperate with contacts on the plugs 23. The contacts 94 are connected with fuse clips 96 arranged to face the side 13 of the box while the contacts 95 are connected with fuse clips 97 arranged to face the side 14 of the box 10. The receptacles 12 are supported in the box so as to be substantially spaced from the plates 11 and the parts mounted thereon and so as to face and be at the end 15 of the box 10.

It will be noted from inspection of the drawings that the fuse clips in connection with the switch 11ᵇ are opposite the fuse clips in connection with the receptacles so that fuses 26 may be arranged in the clips to form connection between the switch parts and the receptacle as shown throughout the drawings.

The lead wires A, B, and C, carrying the main supply circuit, may enter the box 10 through an opening 20 in the top 17 in the manner clearly shown in Fig. 5 of the drawings. A suitable protective bracket or shield 21 may be mounted on the exterior of the top 17 at the opening 20 in the manner shown throughout the drawings. The end 15 of the box 10 is formed with an aperture or opening 22 to allow placement of the plugs 23 in the sockets 12 which are mounted at the end 15 of the box 10 as above described. Openings 24 with hinged closures 25 are provided in the sides 13 and 14 of the box opposite the fuses 26 in order that the fuses 26 may be easily and conveniently placed in and removed from the fuse clips when necessary. An opening 27 with a hinged closure 28 may be provided in the end 16 of the box 10 in order to provide access to the switch 116 mounted on the switch plate 11. The various hinged closures provided on the openings in the box 10 may be equipped with suitable catch devices 29 for holding or locking them in closed position. With the general construction and arrangement above outlined the essential parts of the device are easily and conveniently accessible for purpose of adjustment or repair thus making the device convenient and desirable for practical use. However, it will be understood that the general arrangement and construction herein so far set forth is more or less typical of that which may be employed in carrying out the present invention and is not intended to specifically limit the invention in any way.

The wires A, B and C carrying the supply circuit enter the casing through the opening 20 in top 17 and connect to terminals or binding posts 30, 31 and 32 respectively. The binding post 30 is directly connected with switch jaw 33, while the binding post 32 is directly connected in switch jaw 34. The binding post 31 does not connect directly to any switch jaw but is connected to a bus-bar 35 which connects with a bus-bar 36 which carries fuse clips 37, 38, 39 and 40. The switch jaw 33 is connected directly with a bus-bar 41 which connects to a bus-bar 42 on which are carried fuse clips 43 and 44. The switch jaw 34 is directly connected to a bus-bar 45 which connects to switch jaw 46 at the opposite end of the switch to that at which the jaws 33 and 34 are arranged. The switch jaw 46 is in connection with a bus-bar 47 which carries a fuse clip 48. The switch jaw 56, which is at the same end of the switch as the jaws 34 and 33, is connected with the blade mounting 55 by bus-bar 60. The blade mounting 55 is in turn connected with a bus-bar 61, which carries two fuse clips 62 and 63, by a bus-bar 64. The switch jaw 57, which is at the same end of the switch as the jaws 46 and 58, is connected with the bus-bar 42 by a bus-bar 65, while the switch jaw 58 is connected with bus-bar 36 by a bus-bar 66. Pivotal mounting 54, which carries the blade 51, has connection with a bus-bar 68 which connects to fuse clip 69. The pivotal mounting 53 which carries the switch blade 50, is connected to a bus-bar 70 which connects to a bus-bar 71 on which is carried fuse clips 72 and 73.

In the preferred form of the invention the bus-bars 35, 64, 66, 41, 70 and 47 support the bus-bars 36, 42, 61 and 71 and also the insulating strips 75, 76 and 77. The insulating strips 75, 76 and 77 space and insulate the bus-bars 36, 42, 71 and 61 from each other and also support or carry the fuse socket just referred to so that they are insulated from each other and so that they have connection with the proper bus-bars. This manner of construction is neat, simple and particularly effective. The bus-bars may be amply spaced so that there is no danger of arcing between them and at the same time be accessible in the event that it is necessary to repair or replace them.

From inspection of the drawings it will be noted that the fuse clips, that have direct connection with the switch parts form pairs each adapted to have connection with one of the plug receptacles. For instance, the clips 37 and 72 connect to the clips 96 and 97 of one plug receptacle 12, the clips 38 and 48 connect with clips 96 and 97 of another plug receptacle 12, the clips 62 and 73 connect to clips 96 and 97 of another plug receptacle 12, the clips 63 and 44 connect to clips 96 and 97 of another plug receptacle 12, the clips 39 and 69 connect to clips 96 and 97 of another plug receptacle 12, and the clips 40 and 43 connect to clips 96 and 97 of still another plug receptacle 12.

When the device is connected in a three wire circuit where there is equal voltage across any two of the wires, for instance, say when it is connected in a 110 volt, three phase A. C. circuit where there is 110 volts between any two of the wires, the switch blades 50, 51 and 52 are thrown, or positioned so that they connect the pivotal mountings 53, 54, and 55 with the switch jaws 33, 56 and 34 respectively, as shown in Figs. 4, 5 and 9 of the drawings. With this positioning of the switch blades there will be two plug receptacles 12, carried between the wires AB, there will be two plug receptacles carried between the wires BC, and there will be two plug receptacles carried between wires AC. This balances the circuit and gives 110 volts at each of the plugging sockets. The exact connections effected by this positioning of the switch blades is shown in the diagram Fig. 9 and is as follows. The plug receptacle 12 connected with the fuse clips 72 and 37 is carried between the wires A and B. The clip 72 is connected with the wire A through switch blade 50, the bus-bar 70, and the bus-bar 71. The clip 37 is connected with the wire B through the bus-bar 35 and the bus-bar 36. The plugging socket 12 connected with the clips 48 and 38 is carried by wires C and B. The clip 48 is connected with wire C through bus-bar 45 and bus-bar 47, while the clip 38 is connected with the wire B through the bus-bar 35 and the bus-bar 36. The plugging receptacle 12 connected with the clips 73 and 62 is carried by wires A and C. Fuse clip 73 is connected with the wire A through the switch blade 50 and bus-bar 70, while the fuse clip 62 is connected with the wire C through switch blade 52, bus-bar 64 and bus-bar 61. The plug receptacle 12 connected with fuse clips 44 and 63 is carried by wires A and C. The fuse clip 44 is connected with the wire A through bus-bar 41 and bus-bar 42, while the fuse clip 63 is connected with the wire C through switch blade 52, bus-bar 54 and bus-bar 61. The plug receptacle connected to fuse clips 69 and 39 is carried by wires C and B. The fuse clip 69 is connected with the wire C through switch blade 52, bus-bar 60, switch blade 51, and bus-bar 68, while the fuse clip 39 is connected with the wire B through bus-bar 35 and bus-bar 36. The plug receptacle 12 connected with fuse clips 43 and 40 is carried by wires A and B. The fuse clip 43 is connected with the wire A by bus-bar 41 while the fuse clip 40 is connected with the wire B through bus-bar 35 and bus-bar 36. It is obvious how an operator can very easily maintain substantial balance of the supply circuit by proper plugging into the plug receptacles 12. Assuming that the various apparatus that are connected to the plugging box draws somewhat nearly equal currents, if their connection plugs are put into sockets equally at opposite sides then the current draft on the feed lines is substantially balanced.

When the device is connected to a supply line where the voltage varies between different sets of wires, say, for instance, when it is connected in a circuit where there is 110 volts between wires A and B, 110 volts between wires B and C and 220 volts between the wires A and C, the blades 50, 51 and 52 are positioned to engage the jaws 46, 57 and 58 respectively. A circuit of the character here referred to may be, for instance, a 110—120, D. C. circuit, or it may be a 110—220 single-phase A. C. circuit. The voltage at any one of the plug receptacles 12 will be 110 and one half of the plug receptacles are connected between wires A and B and the other half between wires B and C; and a proper distribution of the plugs feeding various apparatus will then keep the feed circuit substantially in balance. The actual connections effected by this positioning of the switch blades is shown in the diagram in Fig. 10 and are as follows: The plug receptacle which is connected to the fuse clips 72 and 37 is carried between wires C and B. The fuse clip 72 is connected with wires C through bus-bar 45, switch blade 50, bus-bar 70 and bus-bar 71 while the fuse clip 37 is connected to wire B through bus-bar 35 and bus-bar 36. The plug receptacle connected with fuse clips 48 and 38 is carried between wires C and B. The fuse clip 48 is connected with wire C through bus-bar 45 and bus-bar 47, while the fuse clip 38 is connected with wire B through bus-bar 35 and bus-bar 36. The plug receptacle connected with fuse clips 73 and 62 is carried by wires C and B. Fuse clip 73 is connected with wire C through bus-bar 45, switch blade 50, bus-bar 70, while fuse clip 62 is connected with wire B through bus-bar 35, bus-bar 36, bus-bar 66, blade 52, bus-bar 64 and bus-bar 61. The plug receptacle connected with fuse clips 44 and 63 is carried by wires A and B. The fuse clip 44 is connected with wire A through bus-bar 41 and bus-bar 42, while the fuse clip 63 is connected to wire B through bus-bar 35, bus-bar 36, switch blade 52, bus-bar 64 and bus-bar 61. The plug receptacle connected with fuse clips 69 and 39 is carried between wires A and B. The fuse clip 69 is connected with wire A through bus-bar 41, bus-bar 42, bus-bar 65, switch blade 51, and bus-bar 68, while the fuse clip 39 is connected with wire B through bus-bar 35 and bus-bar 36. The plug receptacle 12 connected with fuse clips 43 and 40 is carried by wires A and B. The fuse clip 43 is connected with wire A by bus-bar 41, while the fuse clip 40 is connected with wire B by bus-bar 35 and bus-bar 36.

In the practical construction of the device insulating blocks or partitions 125 are provided or arranged between bus-bars or current carrying parts which are sufficiently close together that there might possibly be arcing. The partitions 125 insulate such bus-bars from each other and eliminate all possibility of arcing or short circuiting.

From the foregoing description it will be obvious how the present device can be very easily and conveniently handled and manipulated, how it may be easily and inexpensively constructed, how it enables balance to be maintained in the supply circuit, how it makes the same voltage available at each of the plug receptacles, etc. It will be also noted that the construction provided by the invention is neat, compact, sightly, durable and convenient.

Having set forth only a preferred form of my invention I do not wish to limit myself to the specific details herein set forth but wish to reserve to myself any changes or variations that may appear to those skilled in the art or that may fall within the scope of the following claims.

Having described a preferred form of my invention, I claim:

1. In a device of the character described, terminals for connection with more than two feed conductors, a plurality of independent plug receptacles each adapted to have electrical connection with two outgoing conductors, a double-throw switch device, a plurality of bus-bars connected with the receptacles and connected with the switch bars and the opposite sets of the double-throw switch terminals so that when the switch is in one of its closed positions certain receptacles are connected in circuit between a certain pair of the feed conductors and when the switch is in its opposite closed position those receptacles are connected in circuit between another pair of the feed conductors.

2. In a device of the character described, three feed terminals adapted to be connected with a three-wire circuit, a plurality of out-going receptacles each with two contacts, a three-pole double-throw switch, and connections between the feed terminals and the receptacles, the switch poles and the switch bars, and connections between the switch poles and bars and the receptacles so that when the switch is in one position certain receptacles are connected in circuit between a certain pair of feed terminals and when in its opposite position such receptacles are connected in circuit between another pair of feed terminals.

In witness that I claim the foregoing I have hereunto subscribed my name.

EDWARD GEORGE BRUEGGEMAN.

Witnesses:
RUTH GRUNDSTROM,
GREENLEAF M. WOODBURY,
BERTRAND C. BRUCE.